United States Patent
Sharma et al.

(10) Patent No.: US 12,217,490 B2
(45) Date of Patent: Feb. 4, 2025

(54) IMAGE PROCESSING APPARATUS, IMAGE PROCESSING METHOD AND NON-TRANSITORY COMPUTER READABLE MEDIUM

(71) Applicant: NEC Corporation, Tokyo (JP)

(72) Inventors: Shreya Sharma, Tokyo (JP); Masato Toda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 612 days.

(21) Appl. No.: 17/603,404

(22) PCT Filed: Apr. 17, 2019

(86) PCT No.: PCT/JP2019/016540
§ 371 (c)(1),
(2) Date: Oct. 13, 2021

(87) PCT Pub. No.: WO2020/213106
PCT Pub. Date: Oct. 22, 2020

(65) Prior Publication Data
US 2022/0254149 A1 Aug. 11, 2022

(51) Int. Cl.
*G06V 10/774* (2022.01)
*G06V 10/44* (2022.01)
*G06V 10/48* (2022.01)

(52) U.S. Cl.
CPC .......... *G06V 10/7753* (2022.01); *G06V 10/44* (2022.01); *G06V 10/48* (2022.01)

(58) Field of Classification Search
CPC ..... G06V 10/7753; G06V 10/44; G06V 10/48
(Continued)

(56) References Cited

U.S. PATENT DOCUMENTS

2017/0061217 A1* 3/2017 Cha .................. G06F 18/2415
2019/0286921 A1* 9/2019 Liang ................ G06F 16/909

FOREIGN PATENT DOCUMENTS

JP 2014-016710 A 1/2014
JP 2018-173914 A 11/2018
(Continued)

OTHER PUBLICATIONS

Japanese Office Action for JP Application No. 2021-558770 mailed on Nov. 22, 2022 with English Translation.
(Continued)

*Primary Examiner* — Ayodeji O Ayotunde
(74) *Attorney, Agent, or Firm* — Sughrue Mion, PLLC

(57) ABSTRACT

An object is to provide an image processing apparatus capable of appropriately distinguishing changes in an area that have occurred over a period of time. An image processing apparatus may include: a difference image generator means to generate a difference image from input SAR images; an intensity change feature extractor means to extract an intensity-based change feature from the difference image; a speckle change feature extractor means to extract speckle-based change features from the input SAR images; a combined feature extractor means to combine the intensity change feature and the speckle change feature to generate a complete representation of changes; and a classifier means to classify the pixels in several change classes using the combined feature and output a change map.

8 Claims, 8 Drawing Sheets

(58) Field of Classification Search
USPC .......................................................... 382/195
See application file for complete search history.

(56) References Cited

FOREIGN PATENT DOCUMENTS

JP          2019-508072 A      3/2019
WO          2018/101985 A1     6/2018

OTHER PUBLICATIONS

International Search Report for PCT Application No. PCT/JP2019/016540, mailed on Jul. 16, 2019.
Written opinion for PCT Application No. PCT/JP2019/016540, mailed on Jul. 16, 2019.
Maoguo Gong, Hailun Yang, Puzhao Zhang, "Feature learning and change feature classification based on deep learning for ternary change detection in SAR images", ISPRS Journal of Photogrammetry and Remote Sensing, vol. 129, Jul. 2017, pp. 212-225.
Bruno Aiazzi, Luciano Alparone, Stefano Baronti, Andrea Garzelli, "Coherence estimation from multilook incoherent SAR Imagery", IEEE Transactions on Geoscience and Remote Sensing, vol. 41, No. 11, November 200, pp. 2531-2539.
Rigot, E.J.M et al., "Change Detection Techniques for ERS-1 SAR Data, IEEE Transactions on Geoscience and Remote Sensing", vol. 31, No. 4, Jul. 1993, pp. 896-906.
Bruno Aiazzi, Luciano Alparone, Stefano Baronti, Andrea Garzelli, "Coherence estimation from multilook incoherent SAR Imagery", IEEE Transactions on Geoscience and Remote Sensing, vol. 41, No. 11, Nov. 2003, pp. 2531-2539.

\* cited by examiner

Image 1     Image 2     Change Map

IMAGE PROCESSING APPARATUS, IMAGE PROCESSING METHOD AND NON-TRANSITORY COMPUTER READABLE MEDIUM

This application is a National Stage Entry of PCT/JP2019/016540 filed on Apr. 17, 2019, the contents of all of which are incorporated herein by reference, in their entirety.

TECHNICAL FIELD

The present disclosure relates to an image processing apparatus, image processing method and image processing program.

BACKGROUND ART

Change detection is a widely researched topic in the image processing field which utilizes multi-temporal images of the same area in order to infer changes which have occurred over a period of time. For detecting changes in large and remote areas such as forests and oceans, satellite images are useful resources. Among satellite images, a Synthetic Aperture Radar (SAR) image is useful for change detection because a SAR image can be acquired day-and-night and under bad weather conditions. Such characteristics are important for change detection applications such as flood mapping and disaster monitoring where an image after such an event is usually corrupted by clouds.

Most traditional change detection methods include two main steps. First, a difference image is generated between the multi-temporal images of the same area to quantify the change amount. Second, a thresholding method or decision function is applied to classify the pixels of the difference image as change and no-change ones or different types of change. A thresholding-based change detection method is disclosed in PL 1. However, the thresholding-based method has certain disadvantages. First, the method assumes that the distributions of change and no-change pixels are non-overlapping. Second, the method requires statistical modelling of change and no-change pixel distributions, which is a complicated task for a non-expert in SAR. Third, the threshold values are generally scene-specific and cannot be applied to a wide variety of scenes.

To solve the above problems, machine learning methods have been employed which formulate change detection as a classification problem where each pixel is assigned a probability of belonging to either a change or a no-change class. The method enables the distributions of each class to be automatically learned from image data itself without requiring SAR domain knowledge. Moreover, the method is not limited by scene-specific threshold values and can be adapted to different scenes through domain adaptation and transfer learning.

A machine learning-based changed detection method is disclosed in NPL 1 as shown by a block diagram in FIG. 7. The method includes three main steps: difference image generation, change feature extraction and classification. First, a difference image is generated from input SAR images using a log-ratio method. The log-ratio method is widely used because the log-ratio method can reduce the influence of speckle noise by converting the multiplicative SAR model into an additive model. Second, features representing change and no-change classes are extracted from the difference image. Third, a classifier is trained with the extracted features and assigns each pixel a probability of belonging to each class.

The related art works well for large changes where a change includes several pixels, but the related art ignores the changes which occur within a pixel. For example, a large change such as demolition or construction of a building can be detected by the related art.

CITATION LIST

Patent Literature

PL 1: United States Patent Publication No. 2017/061217

Non Patent Literature

NPL 1: Maoguo Gong, Hailun Yang, Puzhao Zhang, 2017. Feature learning and change feature classification based on deep learning for ternary change detection in SAR images.
NPL 2: Bruno Aiazzi, Luciano Alparone, Stefano Baronti, Andrea Garzelli, 2003. Coherence estimation from multilook incoherent SAR Imagery.

SUMMARY OF INVENTION

Technical Problem

The related art considers only intensity information, while it ignores speckle information which is a characteristic property of SAR images. Speckle captures information about reflection from objects or areas smaller than a pixel. As a result, the related art cannot capture a small change such as building surface roughness change often caused by weather, pollution or other factors because incomplete change information about the target objects or areas is obtained. This leads to low change detection accuracy.

Speckle is caused by constructive or destructive interference of reflecting signals from objects within a pixel. The interference changes when either surface property or material of an object changes, or arrangement of objects within a pixel changes. An example to illustrate this fact is shown in FIG. 8. The figure shows change within a pixel of an image over a period of time. As shown by (a) in FIG. 8, the change is due to a surface property or material of the object which varies over a period of time. As shown by (b) in FIG. 8, the change is due to an arrangement of objects inside a pixel which varies over a period of time. In both of these examples, the total intensity of a pixel remains the same but the interference of reflecting signals changes. The change in interference causes a change in speckle over the period of time. Therefore speckle captures small changes or sub-pixel level changes which intensity cannot capture, and increases the sensitivity of the change detection system to the small changes.

The related art derived from general image processing and the computer vision field considered speckle to be a noise because its salt and pepper appearance looks similar to that of a random signal noise in optical images. Such a noise is removed in the feature extraction process in the related art which aims to obtain features of an object robust to noise. Therefore, in the related art shown in FIG. 7, the intensity change feature extractor 02 extracts features which remove speckle and captures only intensity change information of an object. The related art ignores the speckle which contains valuable change information about the object, specifically a change which is smaller than a pixel.

The present disclosure has been made to solve the above mentioned problems and the objective thereof is to provide a change detection method which can use both speckle information and intensity information in a machine learning-based method to capture both small and large changes. The present disclosure is not limited to binary change detection and can be applied to multiple change detection where change pixels are classified into several types.

Solution to Problem

An aspect of the present disclosure is an image processing apparatus for change detection using machine learning-based method including:
an intensity change feature extractor means to extract an intensity change feature from the difference image;
a speckle change feature extractor means to extract a speckle change feature from the input SAR images;
a combined change feature extractor means to combine the intensity change feature and the speckle change feature to generate a combined feature; and
a classifier means to map the combined feature to the change classes and output a change map.

An aspect of the present disclosure is an image processing method for change detection using machine learning including:
generating a difference image from input SAR images;
extracting an intensity change feature from the difference image;
extracting a speckle change feature from input SAR images;
combining the intensity change feature and the speckle change feature to generate a combined feature; and
mapping the combined feature to the change classes to output a change map.

An aspect of the present disclosure is an non-transitory computer readable medium storing a program for causing a computer to execute an image processing method for change detection using machine learning, including:
generating a difference image from input SAR images;
extracting an intensity change feature from the difference image;
extracting a speckle change feature from the input SAR images;
combining the intensity change feature and the speckle change feature to generate a combined feature; and
mapping the combined feature to the change classes to output a change map.

Advantageous Effects of Invention

According to the present disclosure, it is possible to provide an image-processing apparatus, an image processing method and an image processing program capable of appropriately classifying changes in two or more SAR images with high accuracy.

DESCRIPTION OF EMBODIMENTS

Hereinafter, exemplary embodiments of the present disclosure are explained in detail with reference to the drawings. The same components are denoted by the same symbols throughout the drawings, and duplicated explanation is omitted as necessary for clarifying the explanation.

Figure 6:
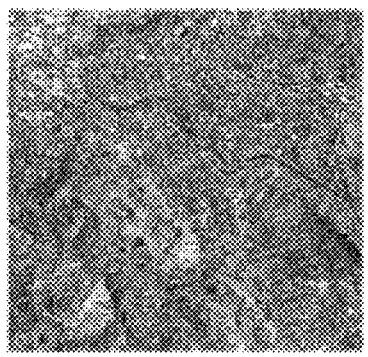
FIG. 6 is a depiction showing the problem formulation of change detection.
Figure 6:
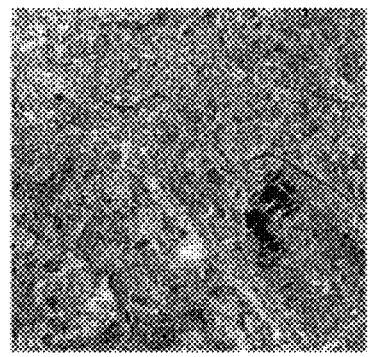
Figure 6:
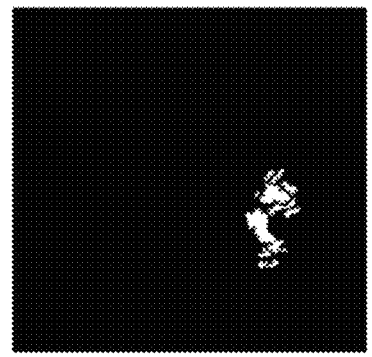

Prior to explaining embodiments, a change detection problem will be explained with reference to FIG. 6. Given two multi-temporal SAR images $I_1$ and $I_2$ of the same area as shown in FIG. 6, the objective of change detection is to generate a change map, representing changes that have occurred between the acquired dates of two images. A SAR image follows a multiplicative model where the observed intensity signal is a multiplication of an actual intensity signal and a multiplicative noise (u) known as speckle. Thus, the two images are modelled as given in EQ. 1.

[Math. 1]
$$I_1 = \sigma_1 u_1, I_2 = \sigma_2 u_2 \qquad (\text{EQ. 1})$$

It is to be noted that the present disclosure is not limited to binary change detection and can be extended to multiple change detection as understood by those skilled in the art.

First Embodiment

Figure 1:
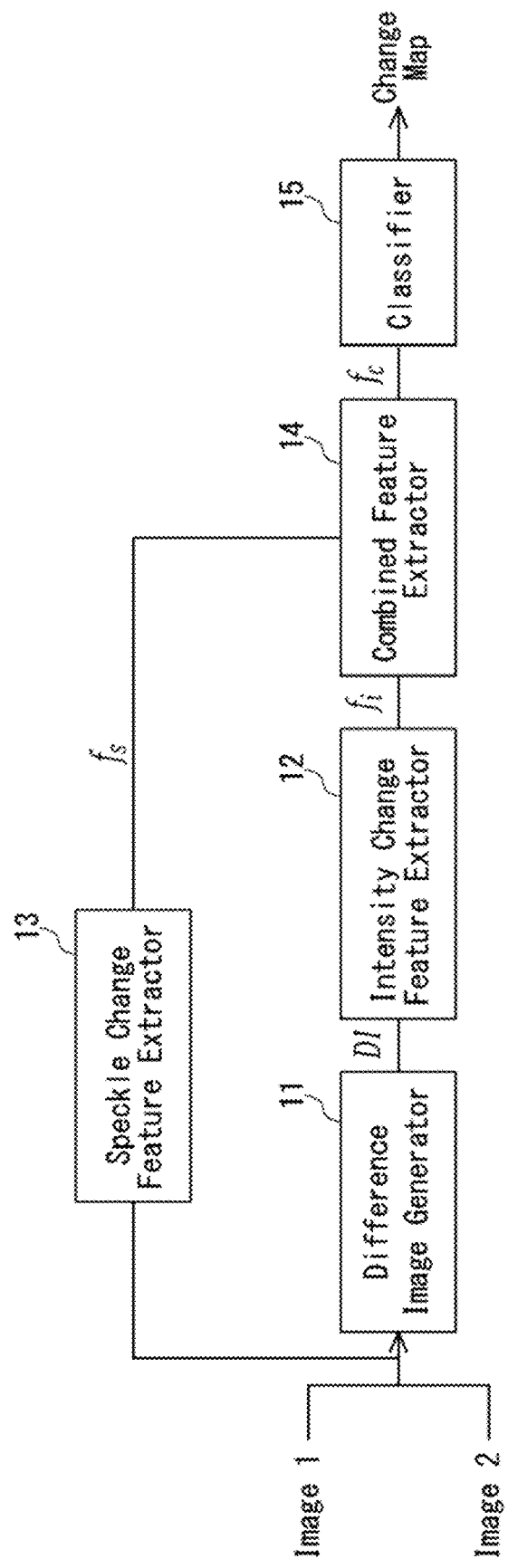
FIG. 1 is a block diagram of the first embodiment in accordance with the present disclosure.

A configuration example of an image processing apparatus in accordance with the first embodiment of the present disclosure will be explained with reference to a block diagram in FIG. 1. The image processing apparatus according to the first embodiment can include a difference image generator 11, an intensity change feature extractor 12, a speckle change feature extractor 13, a combined feature extractor 14 and a classifier 15.

The difference image generator 11 generates a difference image from input SAR images. The intensity change feature extractor 12 extracts features which captures intensity change information of an object. The classifier 15 assigns each pixel a probability to belong to each class.

Figure 7:
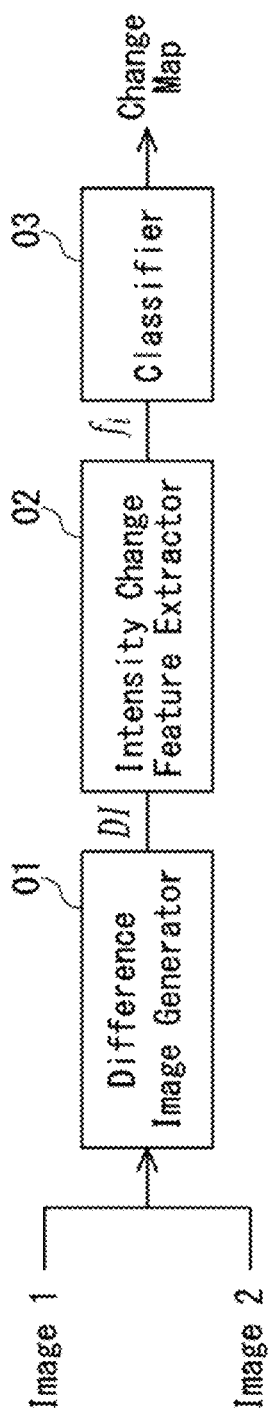
FIG. 7 is a block diagram of machine learning-based change detection method described in NPL 1.
Figure 8:
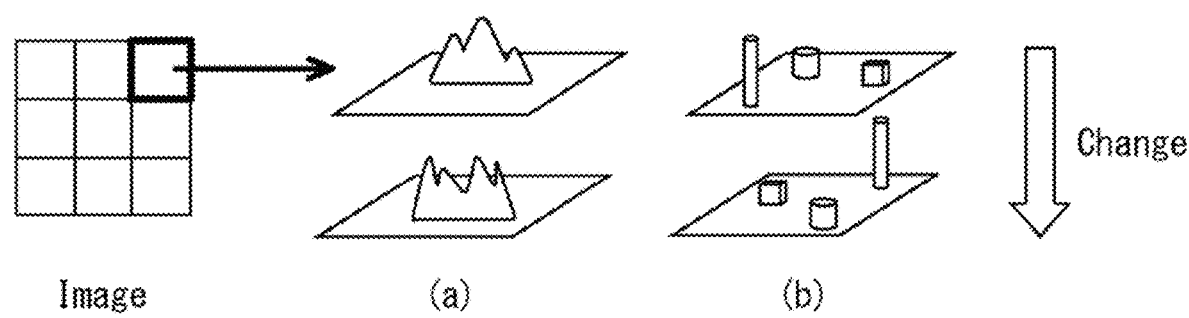
FIG. 8 is a depiction of examples of within pixel changes.

As compared to the related art in FIG. 7, the image processing apparatus in accordance with the first embodiment can further include the speckle change feature extractor 13 and the combined feature extractor 14 to thereby provide more complete change information on the target area or object as compared to that of the related art. The speckle change feature extractor 13 computes the speckle change features of the input SAR images. The combined feature extractor 14 combines the intensity change features and the speckle change features. Next, functioning of these units along with the other units is explained in detail.

The difference image generator 11 receives the input of a pair of SAR images and applies an operator to compute a difference image. Several operators can be used to generate a difference image, a few of the operators are explained as follows. A subtraction operator as indicated in EQ. 2 computes a pixel-by-pixel subtraction between the corresponding pixels in the two images. A ratio operator as indicated in EQ. 3 computes a pixel-by-pixel ratio between the corresponding pixels in the two images. A log-ratio operator as indicated in EQ. 4 computes a pixel-by-pixel ratio followed by natural logarithm between the corresponding pixels in the two images. The present disclosure is not limited to any one of the operators and all the operators are equally acceptable.

[Math. 2]
$$DI_{sub} = I_1 - I_2 \quad (EQ. 2)$$

[Math. 3]
$$DI_{ratio} = \frac{I_1}{I_2} \quad (EQ. 3)$$

[Math. 4]
$$DI_{log-ratio} = \log\left(\frac{I_1}{I_2}\right) \quad (EQ. 4)$$

The intensity change feature extractor 12 receives the input of a difference image (DI) and outputs change feature $f_i$ representing intensity-based change characteristics of the difference image. One of the ways to compute intensity change features is to run a sliding window on the entire image, extract neighborhood pixel intensity values for a central pixel within the sliding window and use the neighborhood pixel intensity values as intensity change features. This process is repeated till the features of all the pixels in the image are obtained. The size of the sliding window can be fixed or varied according to the application. Another way to extract intensity change features is to calculate statistical features such as mean and standard deviation of the neighborhood pixels and use as intensity change features. Still another way is to divide the difference image into non-overlapping sub-images and apply a feature extraction technique such as Principal Component Analysis or deep learning on each sub-image to extract features. Features of all the sub-images are then combined to create features for the entire image.

The speckle change feature extractor 13 receives the input of the pair of SAR images and outputs change feature $f_s$ representing speckle-based change characteristics of the two images. Different methods to extract speckle change features will be explained next. A related art to extract speckle change features from SAR images is shown in NPL 2. A simplified method of the related art will be explained next. First, the input SAR images are transformed into a geometric-mean image $I_G$ and a ratio image $I_R$ using EQ. 5 and EQ. 6 respectively. These transformations preserve the multiplicative noise model of SAR so that the speckle information cannot be lost, unlike the case of the additive noise model.

$$I_G = \sqrt{I_1 \cdot I_2} \quad (EQ. 5)$$

$$I_R = \frac{I_1}{I_2} \quad (EQ. 6)$$

Next, the transformed images $I_G$ and $I_R$ are divided into several non-overlapping sub-images of equal size where the size can be user-defined or empirically-derived. The sub-images of $I_G$ are denoted as $I_{G_1}, I_{G_2}, \ldots I_{G_N}$ and that of $I_R$ are denoted as $I_{R_1}, I_{R_2}, \ldots, I_{R_N}$ where N is the total number of sub-images.

Next, for each sub-image, variance is computed by taking the ratio of standard deviation of all the pixels in the sub-image to the mean of all the pixels in the sub-image as given by EQ. 7.

$$\sigma_{x_y}^2 = \frac{\sqrt{\frac{1}{T^2-1}\sum_{i=1}^{T}\sum_{j=1}^{T}[I_{x_y}(i,j) - \mu_{x_y}]^2}}{\mu_{x_y}} \quad (EQ. 7)$$

where $x \in \{G, R\}$ denotes the transformed image, $y \in [1, n]$ denotes the index of each sub-image, T denotes the size of each sub-image, i and j denote the index of each row and column respectively. $I_{x_y}(i, j)$ denotes the intensity of a pixel at location (i, j) of sub-image y in the transformed image x and $\mu_{x_y}$ is the mean of all the pixel intensity values of sub-image y in the transformed image x which is given by EQ. 8.

$$\mu_{x_y} = \frac{1}{T^2}\sum_{i=1}^{T}\sum_{j=1}^{T}I_{x_y}(i,j) \quad (EQ. 8)$$

The variance calculated using EQ. 7 is a measure of speckle variance. A high variance value indicates high speckle i.e. constructive interference of reflecting signals while a low variance value indicates low speckle i.e. destructive interference of reflecting signals. An example of a high variance area is a forest where there is much interference from reflecting signals due to tree leaves and trunks, and an example of a low variance area is a waterbody where there is very little interference due to the flat surface of the waterbody. By comparing the speckle variance of two images of the same area but taken at different times, an estimate of speckle change over time can be obtained. A speckle similarity measure is defined to compare the speckle variance of each sub-image of $I_G$ and $I_R$ which is given by EQ. 9.

$$f_{s_k} = \frac{4\sigma_{G_k}^2 - \sigma_{R_k}^2}{4\sigma_{G_k}^2 + \sigma_{R_k}^2} \quad (EQ. 9)$$

where $\sigma_{G_k}^2$ is the speckle variance of sub-image k in $I_G$, $\sigma_{R_k}^2$ is the speckle variance of sub-image k in $I_R$ and $f_{s_k}$ is the speckle similarity for sub-image k.

The speckle similarity indicates how similar the speckle in sub-image of $I_G$ is to that of the $I_R$, and is used as a speckle feature for that pair of sub-images. Therefore, the total number of speckle features obtained is equal to the total number of sub-images. Hereinafter, the speckle features are denoted as $f_{s_1}, f_{s_2}, f_{s_3} \ldots f_{s_N}$.

The above method to compute speckle similarity is merely an example and some other alternative methods will be explained below. First, instead of dividing the image into non-overlapping sub-images, overlapping sub-images can be extracted using a sliding window method. This improves the speckle variance accuracy of the pixels which are at the boundary of the two sub-images. Second, to compute speckle similarity $f_s$ from speckle variances $\sigma_{x_y}^2$, some alternative measures, such as Kullback-Leibler divergence, Euclidean Distance and correlation coefficient, can be taken.

The combined feature extractor 14 receives the input of the intensity change features $f_i$ from the intensity change feature extractor 12 and the input of the speckle change features $f_s$ from the speckle change feature extractor 13 and then outputs combined change features $f_c$, which capture the change characteristics of both small and large changes. Several methods can be used to generate a combined features representation, some of which are explained below.

The first possible method is to provide a weighted summation of the intensity and speckle change features for each pixel of the difference image as given by EQ. 10.

$$f_c = w_i f_i + w_s f_{s_n} \quad (EQ. 10)$$

where $f_i$ are the intensity change features of a pixel, $f_{s_n}$ is the speckle change feature of the sub-image n to which the pixel belongs, $w_i$ is a weight of the intensity features and $w_s$ is a weight of the speckle feature. The weights $w_i$ and $w_s$ can be defined by a user or can be derived automatically through an optimization process.

The second possible method is to carry out a concatenation of intensity change features and speckle change features where the speckle change features are appended with the intensity change features column-wise or row-wise, thereby increasing the overall quantity of change features. For example, if there are m intensity change features and one speckle change feature for each pixel, then after concatenation the total combined features are m+1.

The third possible method is taking a dot product of intensity change features and speckle change features for all the pixels. The dot product projects the speckle change features into the intensity change feature space and reduces the variance of the combined features. As an example, if the intensity change features for the entire image are represented as a matrix $F_i$ of size m×n, where m is the number of intensity change features and n is the number of sub-images, and the speckle change features are represented as a vector $F_s$ of size n×1, then the combined change features are represented by a vector $F_C$ of size m×1 given in EQ. 11.

[Math. 5]

$$F_C = F_i \cdot F_s \quad (EQ. 11)$$

The classifier 15 receives the input of the combined change features $f_c$ for each pixel and applies a machine learning algorithm to assign the pixel a class or a probability of belonging to each class. The classifier 15 maps the features of the pixels into classes through an optimization process so that between-class variance is high while within-class variance is low. The number of classes depends on the type of change detection applied. If binary change detection is applied, the number of classes will be two, i.e., change and no-change. If multiple change detection is applied, the number of classes will be more than two. For example, if a SAR image contains pixels of a water-body, a building and a forest, then the multiple change classes can be water-to-building, building-to-forest, forest-to-water or no-change. The classifier unit can be any classification algorithm including but not limited to decision trees, support vector machines or a neural network. The final output of the classifier unit is a change map of the same size as that of the input images with pixels classified into binary classes or multiple classes depending on the application.

The first embodiment in accordance with the present disclosure considers both speckle features and intensity features for change detection by including a speckle change feature extractor and a combined feature extractor. By taking speckle change features into account, the first embodiment of the disclosure can detect sub-pixel level changes which are difficult to extract by the related art which consider only intensity change features. As a result, a better change detection system can be obtained.

Figure 2:
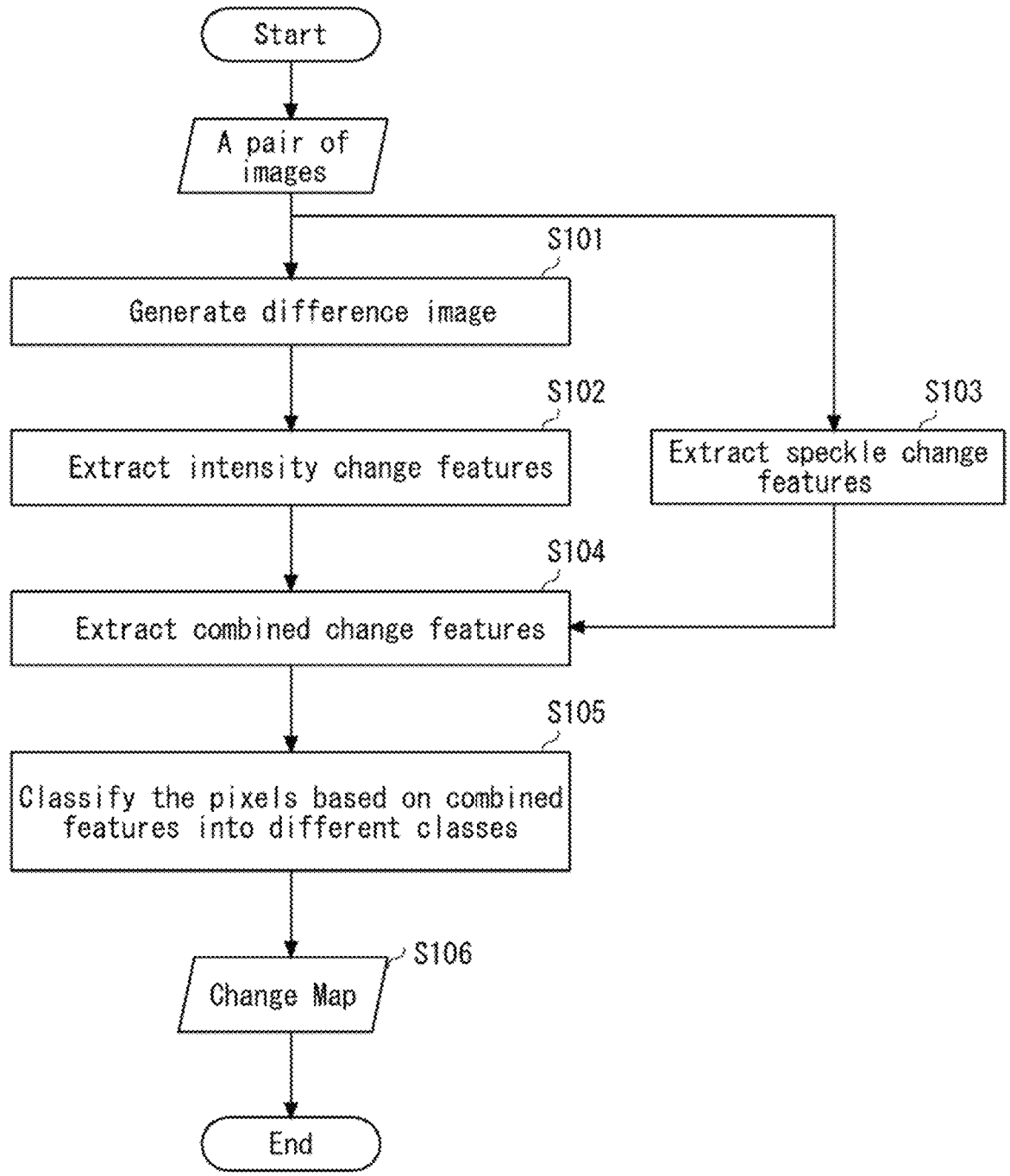
FIG. 2 is a flow chart of the first embodiment in accordance with the present disclosure.

Next, an exemplary flowchart in accordance with the first embodiment of the present disclosure will be explained with reference to FIG. 2. First, the difference image generator 11 reads the input pair of images and generates a difference image (S101). Next, the intensity change feature extractor 12 receives the input of the difference image and extracts intensity change features for each pixel of the difference image (S102). In parallel, the speckle feature extractor 13 receives the input of the pair of images and extracts speckle change features (S103). Next, the intensity change features and the speckle change features are input to the combined feature extractor 14 which generates a combined change feature representation for each pixel (S104). Next, the classifier 15 receives the input of the combined features and classifies the pixels into two classes or multiple change classes (S105). Finally, the classifier 15 outputs a change map where each pixel is assigned a class (S106).

Second Embodiment

Figure 3:
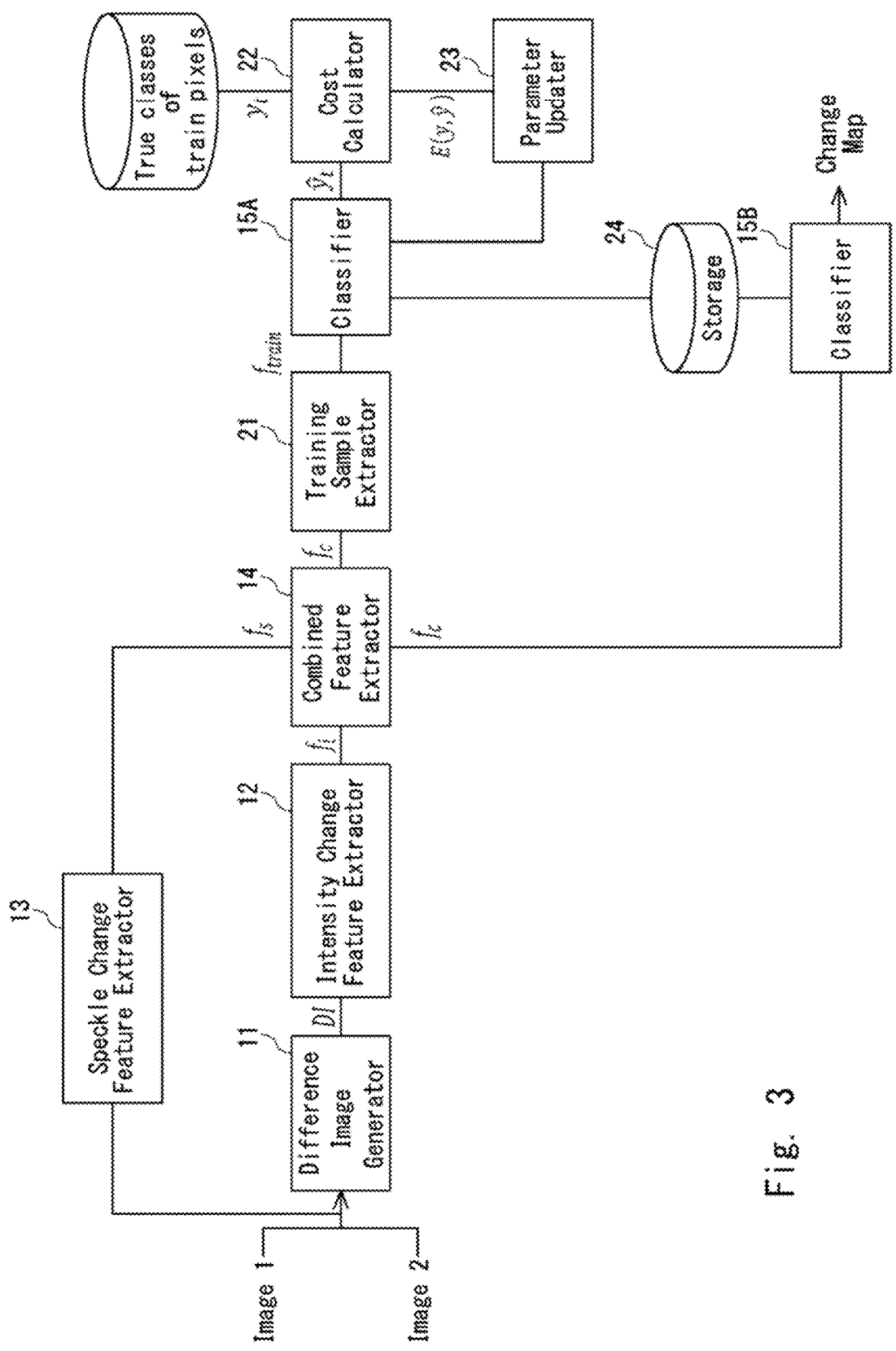
FIG. 3 is a block diagram of the second embodiment in accordance with the present disclosure.

Next, a configuration example of an image processing apparatus in accordance with the second embodiment of the present disclosure will be explained with reference to a block diagram shown in FIG. 3. The image processing apparatus according to the second embodiment includes a difference image generator unit 11, an intensity change feature extractor unit 12, a speckle change feature extractor unit 13, and a combined feature extractor unit 14. The image processing apparatus also includes a training sample extractor 21, a classifier unit 15A in a training mode, a classifier 15B in an actual operational mode, a cost calculator unit 22, a parameter updater unit 23 and a storage unit 24. Note that configurations of the difference image generator unit 11, the intensity change feature extractor unit 12, the speckle change feature extractor unit 13 and the combined feature extractor unit 14 are similar to those explained in the first embodiment of the present disclosure and therefore their explanations are omitted.

The classifier unit 15 according to the second embodiment operates in two modes, a training mode 15A and an actual operational mode 15B. Further, the training sample extractor unit 21, the cost calculator unit 22 and the parameter updater unit 23 operate only in the training mode.

First, the training mode will be explained. In the training mode, the training samples extractor unit 21 receives the input of combined features for all the pixels from combined feature extractor unit 14 and randomly selects a subset of the pixels for training the classifier. This subset of pixels is known as the training samples and their features are denoted by $f_{train}$. The classifier unit 15A receives the input of the combined features corresponding to the training samples and outputs their estimated classes respectively. The cost calculator unit 22 receives the estimated class of each training sample from the classifier unit 15A and the actual class of each training sample from a database. The cost calculator unit 22 calculates a misclassification error between the estimated class and the actual class. The total misclassification error is a weighted average of the misclassification error of each training sample and is calculated using EQ. 12.

$$E(y, \hat{y}) = -\sum_t y_t \log \hat{y}_t \qquad (EQ. 12)$$

where $y_t$ is the actual class of the training sample t, $\hat{y}_t$ is the estimated class of the training sample t and $E(y, \hat{y})$ is the total misclassification error between actual and estimated class for all the training samples Hereinafter, the misclassification error is termed as cost. Note that for the above explanation the calculated cost is the categorical cross-entropy loss as an example. Other loss functions such as Kullback-Leibler divergence, contrastive loss and hinge loss can also be used to compute the cost.

The parameter updater unit 23 receives the cost from the cost calculator unit 22 and updates the parameters of the classifier unit 15A so that the cost is minimized. The minimization of cost can be performed by an optimization algorithm such as gradient descent. The minimization of the cost is continued (or repeated) until the cost converges to a state in which the cost cannot be reduced further. At this stage, the cost has converged and the classifier unit 15A is trained. After convergence, the parameter updater unit 23 stores the parameters of the trained classifier into the storage unit 24. The trained classifier is denoted as 15B in FIG. 3.

Second, the actual operational mode will be explained. In the actual operational mode, the classifier unit 15B receives the input of all the pixels and their change features from the combined feature extractor unit 14 and the trained parameters from the storage unit 24. The trained classifier unit 15B assigns each pixel a class or a probability of belonging to each class using the trained parameters. Finally, the classifier unit 15B outputs a change map with pixels classified into binary classes or multiple classes depending on the application.

The second embodiment in accordance with the present disclosure considers training the classifier unit 15 by calculating a cost function between the estimated and the actual classes. As a result, the classifier unit 15 learns a relationship between the features and their corresponding classes by optimizing the cost function. The classifier unit 15 is trained on variety of changes such that the parameters of the classifier can be stored and then reused to detect changes in any new pair of SAR images.

Figure 4:
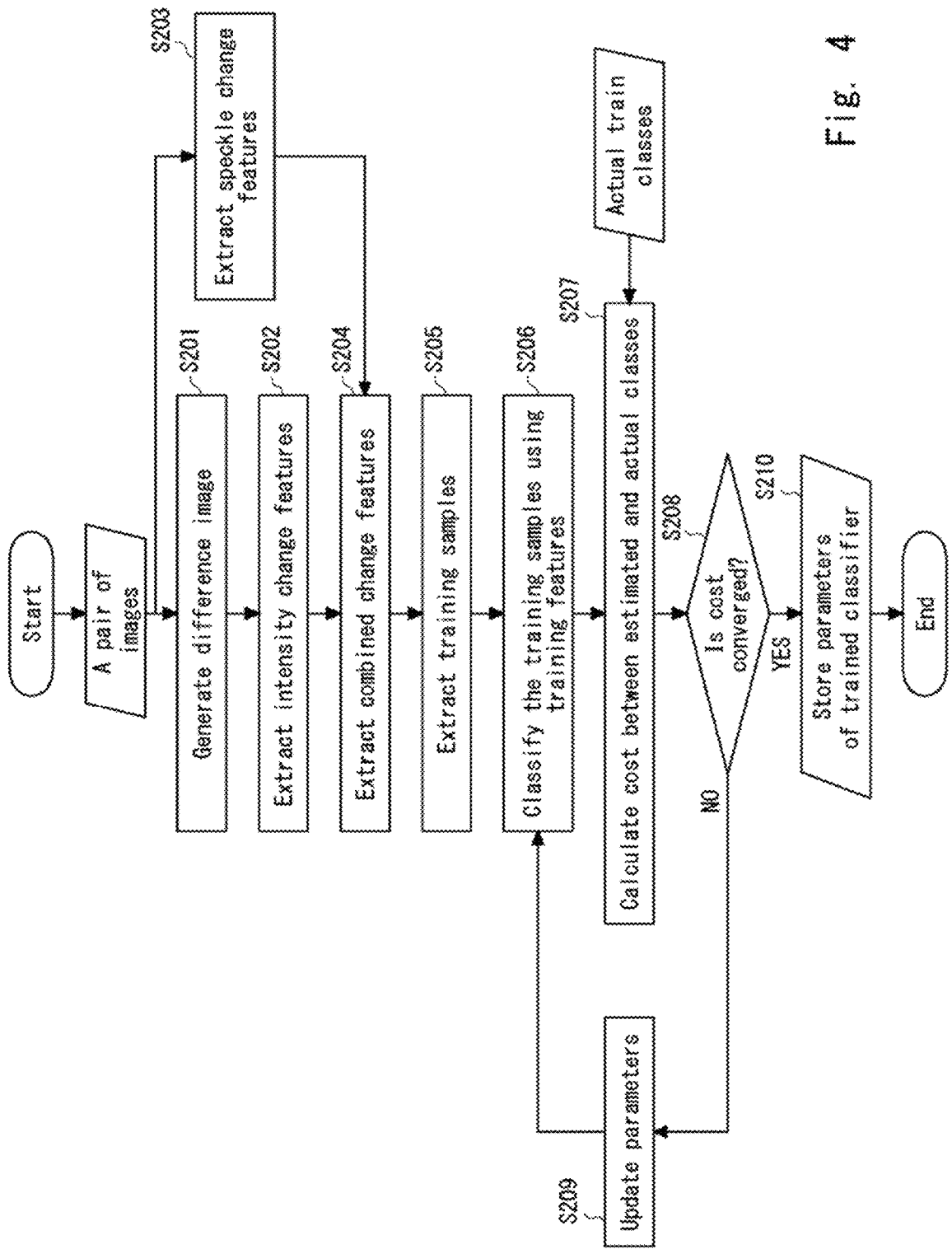
FIG. 4 is a flow chart of the second embodiment in accordance with the present disclosure in training mode.

Next, an exemplary flowchart in accordance with the second embodiment of the present disclosure will be explained with reference to FIG. 4. FIG. 4 shows the training mode of the second embodiment.

First, the difference image generator unit 11 receives the input of the pair of images to generate a difference image (S201). Next, the intensity change feature extractor unit 12 receives the input of the difference image and outputs intensity change features (S202). In parallel, the speckle change feature extractor unit 13 receives the input of the pair of images and extracts speckle change features (S203). Next, the combined feature extractor unit 14 receives the input of the intensity change features and the speckle change features and then outputs a combined feature representation for each pixel (S204). Next, the training sample extractor unit 21 extracts randomly a sub-set of the total number of pixels and outputs them as training samples (S205). The classifier unit 15A inputs features of the training samples and estimates their classes (S206). Next, the cost calculator unit 22 receives the input of the estimated classes and the actual classes of the training samples and then calculates a cost using a cost function (S207). At this point the cost calculator unit 22 makes a decision based on cost convergence (S208). If the cost is not converged, the cost or the misclassification error is input to the parameter updater unit 23. The parameter updater unit 23 updates the parameter of the classifier unit based on the input cost and the process is repeated till the convergence of cost (S209). After convergence, the parameter updater unit 23 stores the parameters of the trained classifier in the storage unit 24 (S210).

Figure 5:
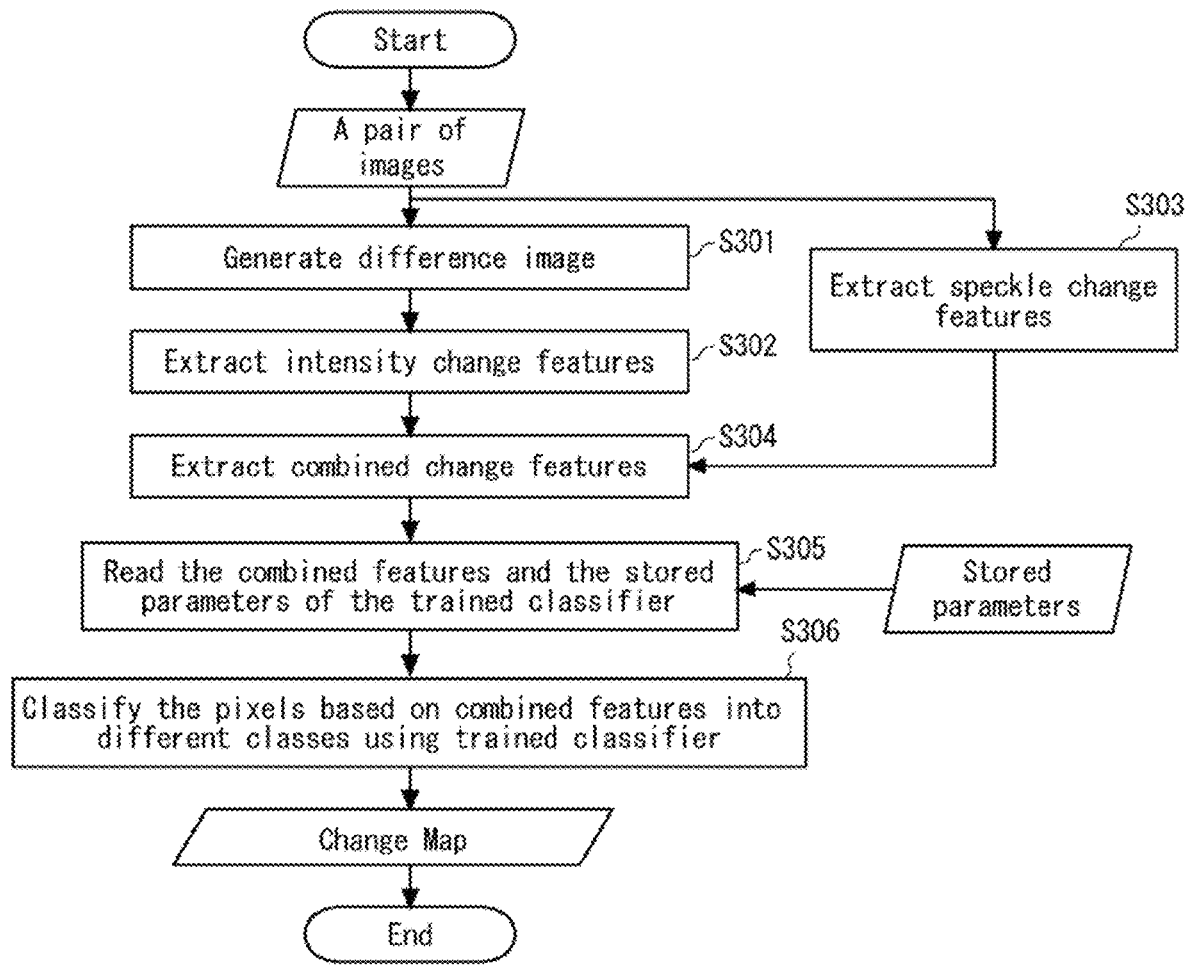
FIG. 5 is a flow chart of the second embodiment in accordance with the present disclosure in actual operational mode.

Next, another exemplary flowchart in accordance with the second embodiment of the present disclosure will be explained with reference to FIG. 5. FIG. 5 figure shows the actual operational mode of the second embodiment.

First, the difference image generator 11 receives the input of the pair of images to generate a difference image (S301). Next, the intensity feature extractor unit 12 receives the input of the difference image and outputs intensity change features (S302). In parallel, the speckle change feature extractor unit 13 receives the input of the pair of images and extracts speckle change features (S303). Next, the combined feature extractor unit 14 receives the input of the intensity change features and speckle change features and then outputs a combined feature representation for each pixel (S304). Next, the classifier unit 15B receives the input of the combined features for all pixels and reads parameters of the trained classifier from the storage unit 24 (S305). Next, the classifier unit with trained parameters classifies the pixels into different classes based on the combined features (S306). Finally, the classifier unit 15B outputs a change map where each pixel is assigned a class.

In the aforementioned embodiments, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magnetooptical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program (s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the present disclosure has been described above with reference to exemplary embodiments, the present disclosure is not limited to the above exemplary embodiments. The configuration and details of the present disclosure can be modified in various ways which can be understood by those skilled in the art within the scope of the invention.

Part of or all the foregoing embodiments can be described as in the following appendixes, but the present invention is not limited thereto.

(Supplementary Note 1)

An image processing apparatus for change detection using machine learning, the apparatus comprising:

a difference image generator means to generate a difference image from input SAR images;

an intensity change feature extractor means to extract an intensity change feature from the difference image;

a speckle change feature extractor means to extract a speckle change feature from the input SAR images;

a combined feature extractor means to combine the intensity change feature and the speckle change feature to generate a combined feature; and a classifier means to map the combined feature to the change classes and output a change map.

(Supplementary Note 2)

The image processing apparatus according to note 1, further comprising:

a cost calculator means to calculate a cost between an estimated class and an actual class as a misclassification error in a training mode;

a parameter updater means to update parameters of the classifier such that the cost is minimized; and a storage means to store the parameters of the trained classifier after the cost convergence, wherein the classifier means learns a relationship between features and the change classes by optimizing a cost function and outputs estimated classes in the training mode.

(Supplementary Note 3)

The image processing apparatus according to note 2, wherein the classifier means operates in actual operational mode using the updated parameters stored in the storage to output a change map for any new pair of SAR images.

(Supplementary Note 4)

The image processing apparatus according to note 1, wherein the difference image generator means is a subtraction, ratio and log-ratio operator.

(Supplementary Note 5)

The image processing apparatus according to note 1, wherein the intensity change feature extractor means extracts intensity changes from the input images using one of Principal Component Analysis and/or deep learning techniques, or an ensemble thereof.

(Supplementary Note 6)

The image processing apparatus according to note 1, wherein the classifier means classifies changes and no-changes using a machine learning-based method one of Decision Trees, Support Vector Machine and Neural Networks, or an ensemble thereof.

(Supplementary Note 7)

An image processing method for change detection using machine learning, the method comprising:

generating a difference image from input SAR images;

extracting an intensity change feature from the difference image;

extracting a speckle change feature from input SAR images;

combining the intensity change features and the speckle change features to generate a combined feature; and mapping the combined feature to the change classes to output a change map.

(Supplementary Note 8)

A non-transitory computer readable medium storing a program for causing a computer to execute an image processing method for change detection using machine learning, the method comprising:

generating a difference image from input SAR images;

extracting an intensity change feature from the difference image;

extracting a speckle change feature from the input SAR images;

combining the intensity change features and the speckle change features to generate a combined feature; and mapping the combined feature to the change classes to output a change map.

REFERENCE SIGNS LIST

11 Difference Image Generator
12 Intensity Change Feature Extractor
13 Speckle Change Feature Extractor
14 Combined Feature Extractor
15 Classifier
21 Training Sample Extractor
22 Cost Calculator
23 Parameter Updater
24 Storage

What is claimed is:

1. An image processing apparatus for change detection using machine learning, the image processing apparatus comprising:

memory storing instructions; and at least one processor, wherein the instructions, when executed by the at least one processor, cause the image processing apparatus to:

generate a difference image from input Synthetic Aperture Radar (SAR) images;

extract an intensity change feature from the difference image;

extract a speckle change feature from the input SAR images;

perform a weighted summation, concatenation or dot product of the intensity change feature and the speckle change feature for each pixel of the difference image to combine the intensity change feature and the speckle change feature to generate a combined feature; and apply a machine learning algorithm to the combined feature for each pixel to assign the pixel a probability of belonging to each change class and map the combined feature to change classes and output a change map.

2. The image processing apparatus according to claim 1, wherein the instructions, when executed by the at least one processor, cause the image processing apparatus to:

calculate a cost between an estimated class and an actual class as a misclassification error in a training mode;

update parameters of a classifier such that the cost is minimized;

store the parameters of the classifier after a cost convergence; and learn a relationship between features and the change classes by optimizing a cost function and outputs estimated classes in the training mode.

3. The image processing apparatus according to claim 1, wherein the instructions, when executed by the at least one processor, cause the image processing apparatus to operate in actual operational mode using the updated parameters stored in the storage to output a change map for any new pair of SAR images.

4. The image processing apparatus according to claim 1, wherein the instructions, when executed by the at least one processor, cause the image processing apparatus to generate the difference image using a subtraction, ratio and log-ratio operator.

5. The image processing apparatus according to claim 1, wherein the instructions, when executed by the at least one processor, cause the image processing apparatus to extract intensity changes from the input SAR images using one of Principal Component Analysis and/or deep learning technique, or an ensemble thereof.

6. The image processing apparatus according to claim 1, wherein the instructions, when executed by the at least one processor, cause the image processing apparatus to classify changes and no-changes using a machine learning-based method selected from one of Decision Trees, Support Vector Machine and Neural Networks, or an ensemble thereof.

7. An image processing method for change detection using machine learning, the image processing method comprising:
   generating a difference image from input Synthetic Aperture Radar (SAR) images;
   extracting an intensity change feature from the difference image;
   extracting a speckle change feature from input SAR images;
   performing a weighted summation, concatenation or dot product of the intensity change feature and the speckle change feature for each pixel of the difference image to combine the intensity change feature and the speckle change feature to generate a combined feature; and
   applying a machine learning algorithm to the combined feature for each pixel to assign the pixel a probability of belonging to each change class and mapping the combined feature to change classes to output a change map.

8. A non-transitory computer readable medium storing a program for causing a computer to execute an image processing method for change detection using machine learning, the method comprising:
   generating a difference image from input Synthetic Aperture Radar (SAR) images;
   extracting an intensity change feature from the difference image;
   extracting a speckle change feature from the input SAR images;
   performing a weighted summation, concatenation or dot product of the intensity change feature and the speckle change feature for each pixel of the difference image to combine the intensity change feature and the speckle change feature to generate a combined feature; and
   applying a machine learning algorithm to the combined feature for each pixel to assign the pixel a probability of belonging to each change class and mapping the combined feature to change classes to output a change map.

* * * * *